(12) United States Patent
Johnson et al.

(10) Patent No.: US 11,008,894 B2
(45) Date of Patent: May 18, 2021

(54) BOAS SPRING CLIP

(71) Applicant: United Technologies Corporation, Farmington, CT (US)

(72) Inventors: Dean W. Johnson, Springvale, ME (US); Thomas E. Clark, Sanford, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 191 days.

(21) Appl. No.: 16/176,668

(22) Filed: Oct. 31, 2018

(65) Prior Publication Data

US 2020/0131939 A1   Apr. 30, 2020

(51) Int. Cl.
*F01D 25/28* (2006.01)
*F01D 11/08* (2006.01)

(52) U.S. Cl.
CPC .............. *F01D 25/28* (2013.01); *F01D 11/08* (2013.01); *F05D 2220/32* (2013.01); *F05D 2230/60* (2013.01); *F05D 2240/55* (2013.01); *F05D 2300/6033* (2013.01)

(58) Field of Classification Search
CPC ......... F05D 2300/6033; F05D 2220/32; F05D 2230/60; F05D 2230/642; F05D 2240/11; F01D 25/246; F01D 25/28; F01D 11/08
See application file for complete search history.

(56) References Cited

U.S. PATENT DOCUMENTS

| 5,188,507 | A |   | 2/1993  | Sweeney    |          |
|-----------|---|---|---------|------------|----------|
| 5,846,050 | A | * | 12/1998 | Schilling  | F01D 9/04 |
|           |   |   |         |            | 415/135  |
| 6,296,443 | B1| * | 10/2001 | Newman     | F01D 9/042 |
|           |   |   |         |            | 415/189  |
| 6,402,466 | B1|   | 6/2002  | Burdgick et al. | |
| 6,942,445 | B2|   | 9/2005  | Morris et al. | |
| 7,195,452 | B2| * | 3/2007  | Allan      | F01D 9/02 |
|           |   |   |         |            | 248/675  |
| 8,079,807 | B2|   | 12/2011 | Shapiro et al. | |
| 8,257,029 | B2|   | 9/2012  | Habarou et al. | |
| 8,920,112 | B2| * | 12/2014 | Ring       | F01D 25/04 |
|           |   |   |         |            | 415/119  |
| 9,188,062 | B2| * | 11/2015 | Tsutsumi   | F01D 11/003 |
| 9,822,668 | B2| * | 11/2017 | Duguay     | F01D 25/246 |

(Continued)

FOREIGN PATENT DOCUMENTS

| CN | 106948872 A | * | 7/2017 | ........... F01D 25/246 |
| EP | 3093449 A1 |   | 11/2016 | |
| EP | 3093455 A1 |   | 11/2016 | |

OTHER PUBLICATIONS

European Search Report dated Jan. 7, 2020 issued for corresponding European Patent Application No. 19206352.7.

(Continued)

*Primary Examiner* — Igor Kershteyn
*Assistant Examiner* — Wayne A Lambert
(74) *Attorney, Agent, or Firm* — Bachman & LaPointe, P.C.

(57) ABSTRACT

A clip for an air seal assembly, comprising a clip base having a control ring interface; a biasing element coupled to the clip base opposite the control ring interface; wherein the clip is insertable into a clip receiver and configured to engage a notch of a blade outer air seal and configured to detachably couple with a clip mounting flange.

14 Claims, 6 Drawing Sheets

(56) References Cited

U.S. PATENT DOCUMENTS

| | | |
|---|---|---|
| 9,932,901 B2 | 4/2018 | Sener |
| 10,215,056 B2 | 2/2019 | Sippel et al. |
| 10,422,241 B2* | 9/2019 | McCaffrey ............ F01D 25/246 |
| 2012/0107107 A1* | 5/2012 | Chan ....................... F01D 11/08 |
| | | 415/182.1 |
| 2016/0312661 A1 | 10/2016 | Duguay et al. |
| 2017/0130600 A1 | 5/2017 | Shapiro et al. |
| 2018/0080344 A1 | 3/2018 | Roussille et al. |
| 2018/0156068 A1 | 6/2018 | Roussille et al. |
| 2018/0238188 A1 | 8/2018 | Shoemaker et al. |
| 2019/0010818 A1 | 1/2019 | Lambert et al. |
| 2019/0368366 A1* | 12/2019 | Clark ...................... F01D 11/08 |

OTHER PUBLICATIONS

European Search Report dated Jan. 3, 2020 issued for corresponding European Patent Application No. 19206669.4.
U.S. Non-final Office action dated Jun. 5, 2020 issued for corresponding U.S. Appl. No. 16/176,665.

\* cited by examiner

BOAS SPRING CLIP

BACKGROUND

The disclosure relates to a spring clip for a ceramic matrix composite (CMC) laminated blade outer air seal (BOAS) with an axially facing core mandrel.

An axial flow, gas turbine engine has a compression section, a combustion section and a turbine section. An annular flow path for the working fluid extends axially through the sections. A stator assembly extends about the annular flow path for confining the working fluid to the flow path and for directing the fluid along the flow path.

As the working fluid flows along the flow path, the working fluid is pressurized in the compression section and burned with fuel in the combustion section to add energy to the working fluid. The hot, pressurized working fluid is expanded through the turbine section to produce work. A major portion of this work is used for driving a free turbine or developing thrust for an aircraft.

A remaining portion of the work generated by the turbine section is not used for these purposes, Instead it is used to compress the working fluid itself. A rotor assembly extends between the turbine section and the compression section to transfer this work from the turbine section to the compression section. The rotor assembly in the turbine section has rotor blades which extend outwardly across the working medium flow path. The rotor blades have airfoils, which are angled with respect to the approaching flow to receive work from the working fluid and to drive the rotor assembly about the axis of rotation.

An outer air seal circumscribes the rotor blades to confine the working fluid to the flow path. The outer air seal is part of the stator structure and is formed of a plurality of arcuate segments. The stator assembly further includes an outer case and a structure for supporting the segments of the outer air seal from the outer case. The outer case and the support structure position the seal segments in close proximity to the blades to block the leakage of the working fluid past the tips of the blades. As a result, the segments are in intimate contact with the hot working fluid, that receives heat from the working fluid and are cooled to keep the temperature of the segments within acceptable limits.

The use of ceramic matrix composite blade outer air seals require large contact areas to reduce delamination risk and reduce bearing loads. A ceramic matrix composite blade outer air seal that includes many radial features inherently creates high thermal gradients. Axially installed BOAS require an attachment feature to keep them connected to the control ring. These parts can be complicated to manufacture as well as install. BOAS also need to be preloaded for low speed operations.

Accordingly, it is desirable to provide a spring clip that enables an alternative efficient system and method to assure a proper outer air seal to blade tip interface that can be individually installed or removed, while reducing the stresses from thermal gradients.

SUMMARY

In accordance with the present disclosure, there is provided a clip for an air seal assembly, comprising a clip base having a control ring interface; a biasing element coupled to the clip base opposite the control ring interface; wherein the clip is insertable into a clip receiver and configured to engage a notch of a blade outer air seal and configured to detachably couple with a clip mounting flange.

In another and alternative embodiment the blade outer air seal comprises a blade outer air seal control ring comprising: a leading edge side and a trailing edge side opposite the leading edge side, a hook protruding axially from the trailing edge side, the clip receiver communicating through the blade outer air seal control ring from the leading edge side to the trailing edge side, the clip mounting flange extending from the trailing edge side proximate the receiver; a blade outer air seal coupled to the blade outer air seal control ring, the blade outer air seal comprising: a body having a leading edge and a trailing edge opposite thereof, a pocket formed into the body having an upper region and a lower region, the pocket configured to receive and engage with the hook; the notch being formed into the upper region, a shelf formed from the lower region extending axially outward from the pocket on the trailing edge side of the body; and the clip insertable into the clip receiver and configured to engage the notch of the blade outer air seal and configured to detachably couple with the clip mounting flange.

In another and alternative embodiment the blade outer air seal comprises a ceramic matrix composite material.

In another and alternative embodiment the clip is configured to be biased to retain the blade outer air seal engaged with the control ring.

In another and alternative embodiment the biasing element is configured to detachably engage the clip mounting flange and the upper region of the blade outer air seal.

In another and alternative embodiment the clip is configured to prevent axial rotation of the blade outer air seal.

In another and alternative embodiment each of the plurality of blade outer air seals are configured to be individually installed and removed from the blade outer air seal control ring.

In another and alternative embodiment the clip with the notch and the hook are configured as an anti-rotation feature to inhibit rotation of the blade outer air seal.

In another and alternative embodiment the clip base is formed to fit within the clip receiver.

In another and alternative embodiment the biasing element is configured as a curved sheet with at least one of a U bend, S bend, and hook shaped profile.

In another and alternative embodiment the biasing element is welded onto the clip base opposite the control ring interface.

In another and alternative embodiment the clip is configured to employ a radial preloading force to trap the blade outer air seal in a mounted position.

In another and alternative embodiment the clip base comprises a T cross section configured to secure the clip in the clip receiver.

In an exemplary embodiment, the disclosure relates to a spring clip for a CMC laminated BOAS with an axially facing core. Two radial walls extend axially from leading to trailing edges along the mating faces to allow intersegment feather seals and promote constant wall thickness. Centered on the outside diameter is a rectangular anti-rotation notch, which also receives a spring clip. The BOAS includes a constant wall thickness along the span of the BOAS. The constant wall thickness reduces stresses from thermal gradients. The BOAS can be ship lapped as part of the laminate preform to promote sealing and to trap feather seals. The axial cavity of the BOAS allows individual BOAS installation or removal and also promotes a large contact surface. The assembly includes a cobalt alloy spring clip that is axially assembled into a full hoop carrier ring to both anti-rotate the BOAS as well as provide radial preloading to trap the BOAS in the assembly.

In an exemplary embodiment, an axially installed spring clip is disclosed. A wide control ring interface feature is located at the front, followed by an anti-rotation feature and sheet metal spring/clip. The sheet metal region could be welded to the machined anti-rotation feature. Four faces of the clip mate with a countersunk feature in the control ring and the spring holds the BOAS in place, while providing a preloading force.

Other details of the clip for the ceramic matrix composite blade outer air seals are set forth in the following detailed description and the accompanying drawings wherein like reference numerals depict like elements.

DETAILED DESCRIPTION

Figure 1:
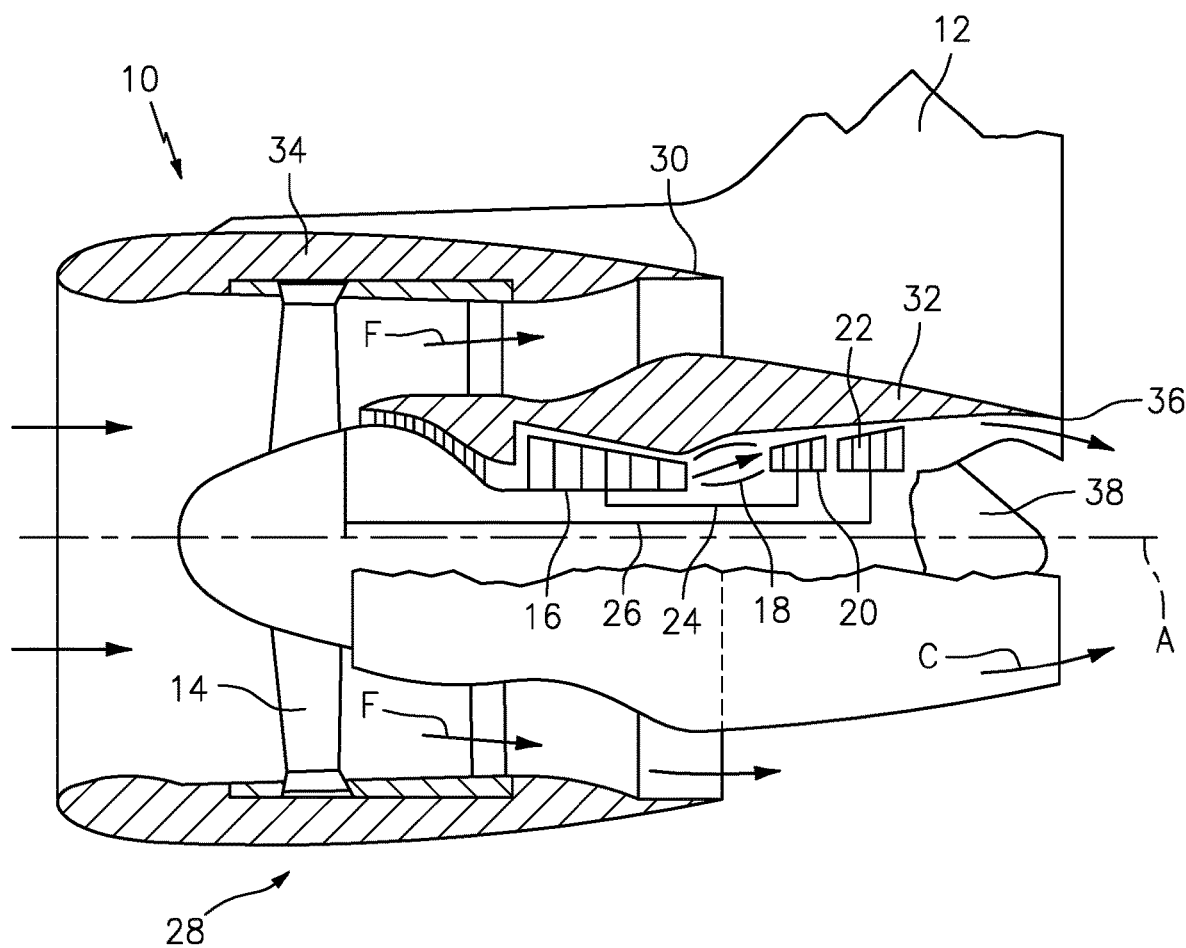
FIG. 1 is a schematic representation of an exemplary gas turbine engine.

FIG. 1 shows a general partial fragmentary view of a gas turbine engine 10 suspended from an engine pylon 12. The engine 10 typically includes in serial flow communication with a low pressure compressor driven fan assembly 14, a high pressure compressor 16, an annular combustor 18, high pressure turbine 20, and low pressure turbine 22. During operation, air is pressurized in the compressor and mixed with fuel in the combustor for generating hot combustion gases which flow through the high and low pressure turbines that extract energy therefrom. The high pressure turbine 20 powers the high pressure compressor through a high pressure turbine/high pressure compressor shaft assembly 24 and the low pressure turbine 22 powers the low pressure compressor fan assembly 14 through a low pressure turbine/fan rotor shaft assembly 26. It should be understood that the shaft assembly 24, 26 may include various shafts which coaxially rotate in a common or counter rotation arrangement.

The exemplary engine 10 is in the form of a high bypass ratio engine mounted within a nacelle assembly 28 in which most of the air pressurized by the fan assembly 14 bypasses the core engine itself for generating propulsion thrust. The fan air F is discharged from the engine 10 through a fan nozzle section 30 defined radially between a core nacelle 32 and a fan nacelle 34. The core exhaust gases C are discharged from the core engine through a core exhaust nozzle 36 defined between the core nacelle 32 and a center plug 38 disposed coaxially therein around an engine longitudinal centerline axis A of the engine 10 and nacelle.

Figure 2:
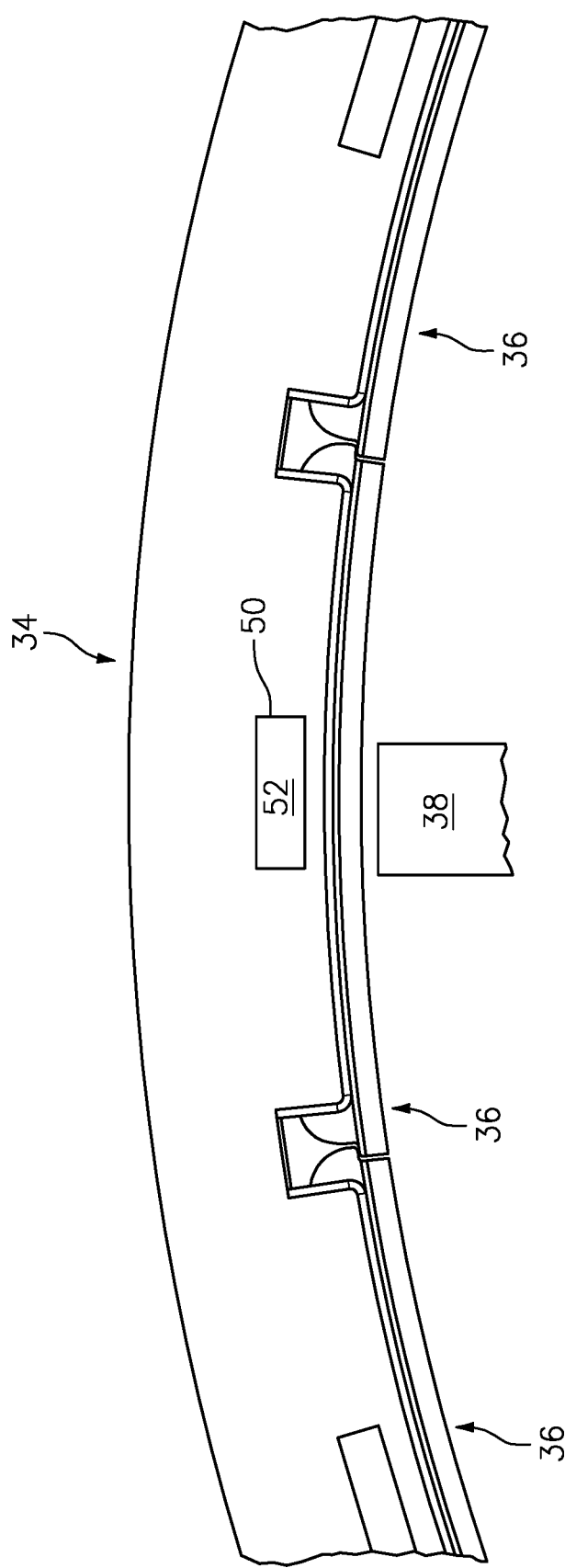
FIG. 2 is a schematic representation of a blade and outer air seal portion of the exemplary gas turbine engine.

FIG. 2 is a schematic representation of a blade and outer air seal portion of the exemplary gas turbine engine. A blade outer air seal control ring, or simply control ring 34 is shown. The control ring 34 supports each individual blade outer air seal 36. The blade 38 is shown proximate the blade outer air seal 36. The blade outer air seals 36 are mounted to the control ring 34 in an axial fashion, along the engine longitudinal centerline axis A.

Referring also to FIGS. 3-10, the control ring 34 includes a leading edge side 40 and a trailing edge side 42 that is axially opposite the leading edge side 40. The control ring 34 includes an exterior 44 and an interior 46 radially opposite the exterior 44. A hook 48 protrudes axially from the trailing edge side 42 proximate the interior 46. The hook 48 is arranged to support each blade outer air seal 36, thus multiple hooks 48 are configured along the interior side 46 of the control ring 34 to support the array of blade outer air seals 36. The hook 48 is a relatively large structure that distributes the stresses across the contacting surfaces between the blade outer air seal 36 and the control ring 34.

A clip receiver 50 is formed from in the control ring 34. The clip receiver 50 is shown as a rectilinear through bore open from the leading edge side 40 to the trailing edge side 42. The clip receiver 50 is configured to receive a clip 52. The clip receiver 50 can be formed in a variety of shapes to match the clip 52 design.

The clip 52 is configured to be biased to retain the blade outer air seal 36 engaged with the control ring 34 and prevent axial rotation of the blade outer air seal 36. The clip 52 includes a clip base 54 formed to fit within the clip receiver 50. The clip base 54 is formed with a thickness that snugly interfaces within the clip receiver 50 and prevents rotation that acts as an anti-rotation feature for the blade outer air seal 36. In an exemplary embodiment, the clip base 54 can be configured as a T cross section to secure the clip 52 in the clip receiver 50. The clip base 54 can include a control ring interface 55 that matches the clip receiver 50. A biasing element 56 extends from the clip base 54 opposite the control ring interface 55. The biasing element 56 is formed to retain the blade outer air seal 36 and press against the blade outer air seal 36 and a corresponding clip mounting flange 58. In an exemplary embodiment, the biasing element 56 can be configured as a curved sheet with a U bend or S bend, hook shaped profile. In an exemplary embodiment, the biasing element 56 can be welded onto the clip base 54 opposite the control ring interface 55. In an exemplary embodiment, the clip 52 can comprise a cobalt alloy material, or other alloy or material that exhibits good wear properties with the materials of the control ring 34 and blade outer air seal 36. The clip 52 can provide radial preloading to trap the blade outer air seal 36 in a mounted position. The clip 52 is formed with the two regions, the clip base 54 and biasing element 56 for structural anti-rotation and flexible retention. The clip 52 is configured to preload the blade outer air seal 36 for low speed operation of the engine 10. The clip 52 also enables the individual installation and removal of the blade outer air seal 36. The simplicity of the clip 52 design allows for use in multiple blade outer air seal 36 configurations.

Figure 3:
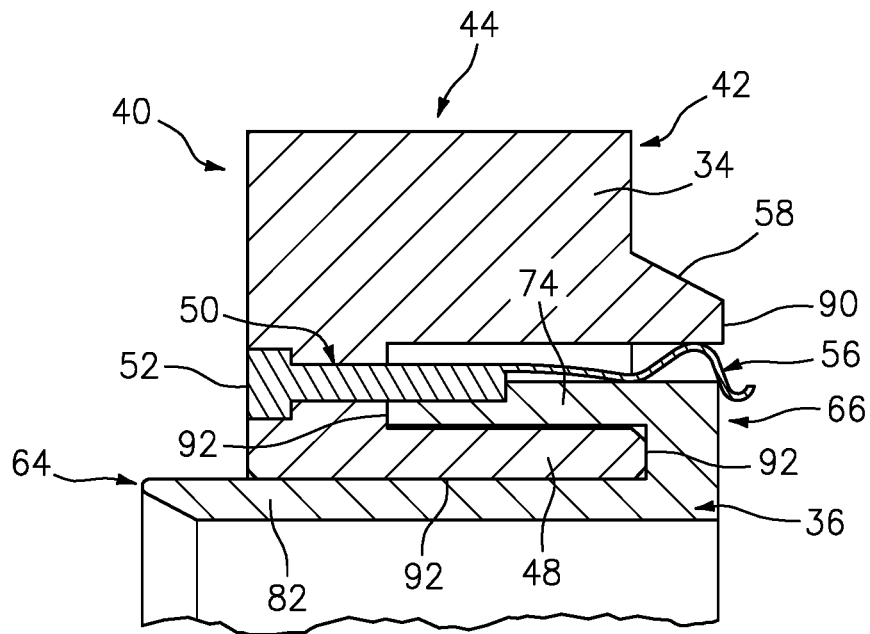
FIG. 3 is a cross section of an exemplary CMC pocket BOAS inserted into a BOAS control ring with spring clip according to the disclosure.
Figure 4:
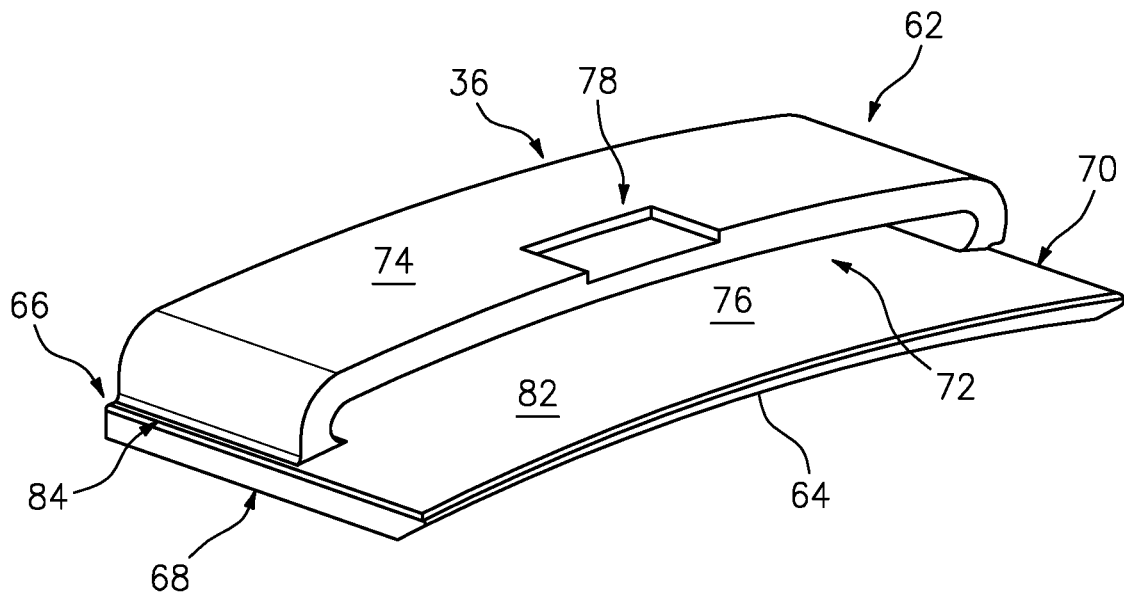
FIG. 4 is a perspective view of the exemplary CMC Pocket BOAS of FIG. 3.
Figure 5:
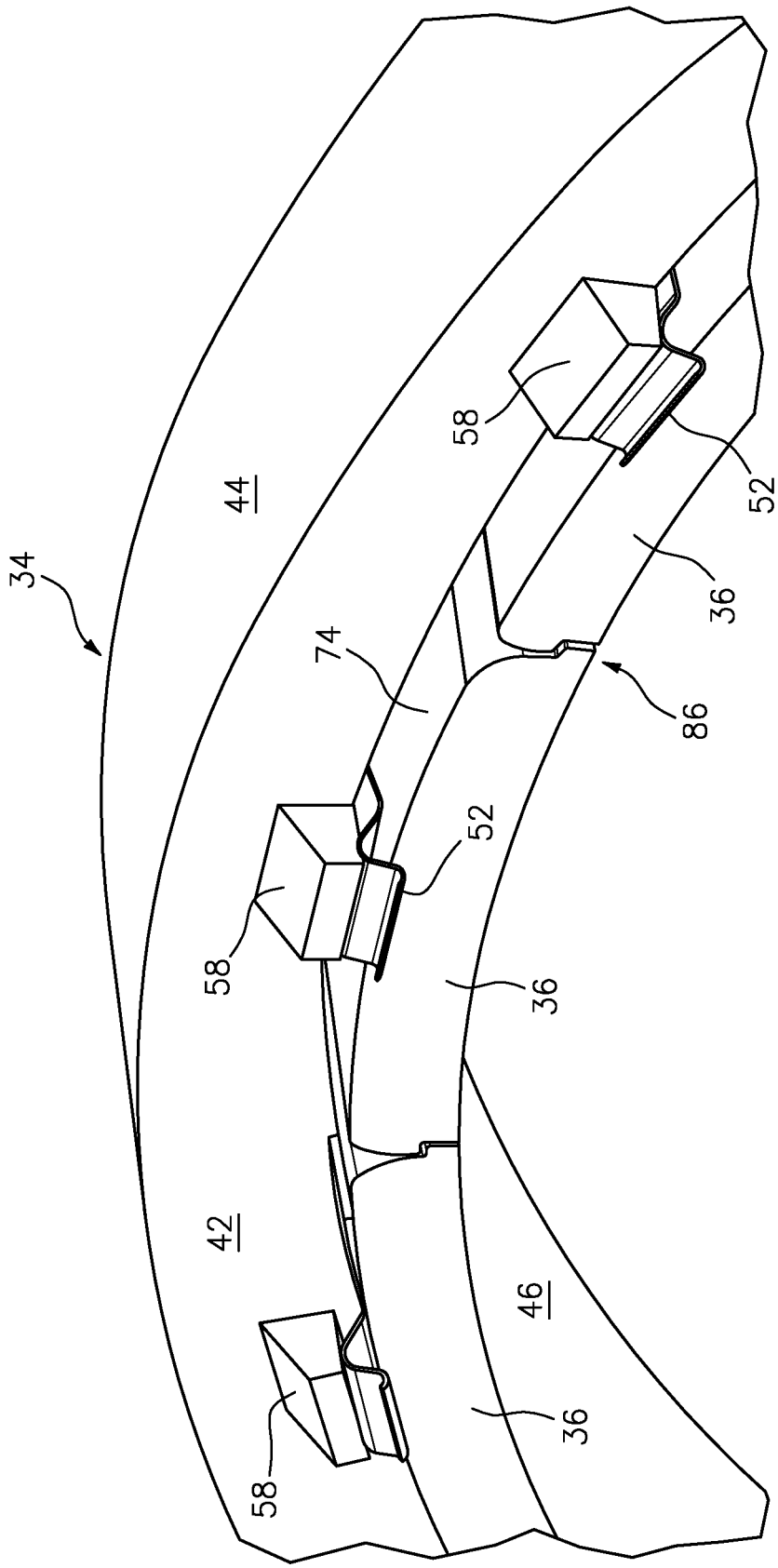
FIG. 5 is a perspective view of the trailing edge of the BOAS control ring with CMC pocket BOAS and spring clip of the configuration of FIG. 3.
Figure 6:
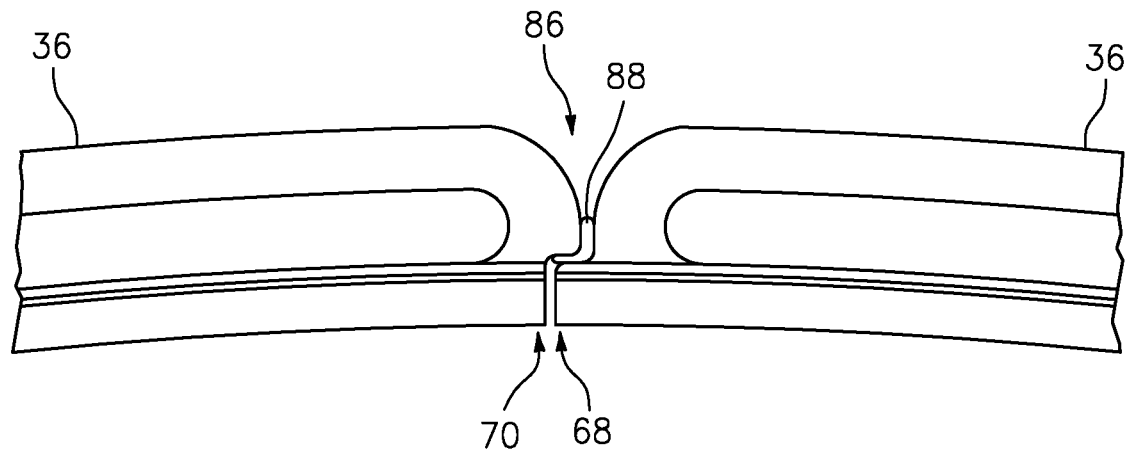
FIG. 6 is a perspective view of an assembly of multiple exemplary CMC Pocket BOAS with a ship lap side to side alignment.
Figure 7:
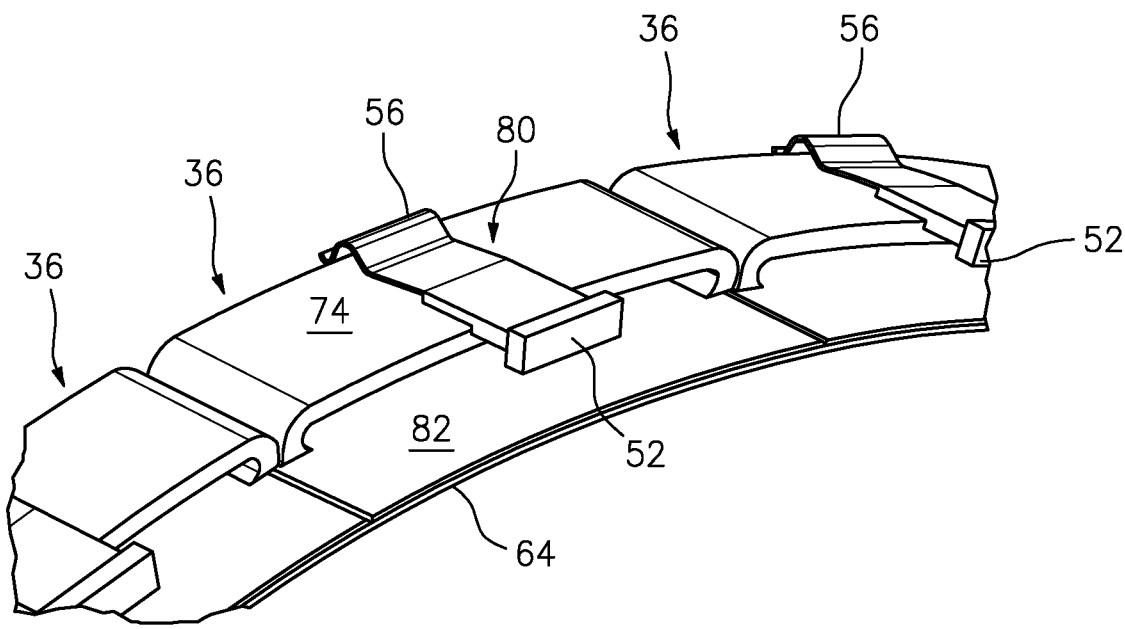
FIG. 7 is an enlarged view of ship lap side to side exemplary CMC Pocket BOAS.
Figure 8:
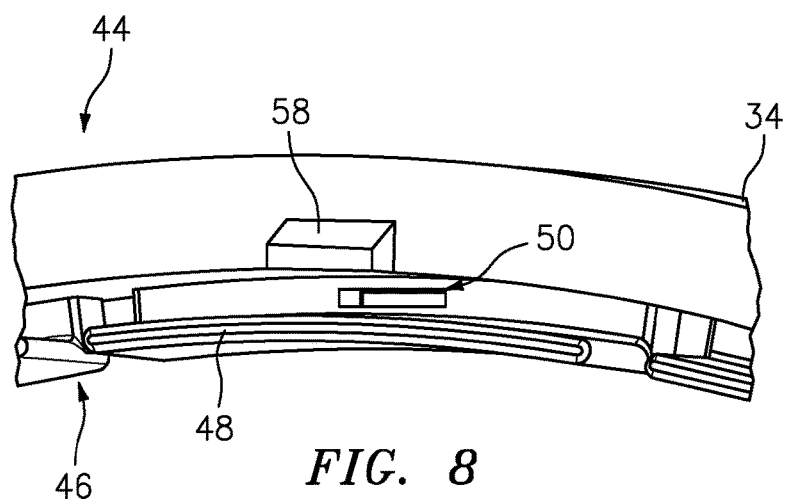
FIG. 8 is a perspective view of the BOAS control ring.
Figure 9:
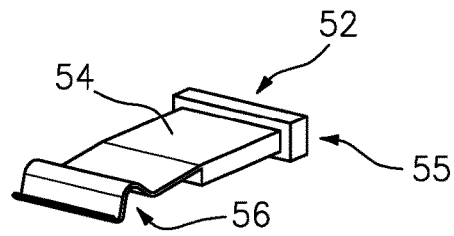
FIG. 9 is a perspective view of an exemplary spring clip.

The clip mounting flange 58 is formed in the control ring 34 and extends from the trailing edge 42 proximate the clip receiver 50. In an exemplary embodiment, the clip mounting flange 58 extends axially from the trailing edge flush with the blade outer air seal 36 as shown in FIG. 3. A clip mounting flange 58 can be associated with each blade outer air seal 36 and clip 52, as shown in FIG. 5.

Figure 10:
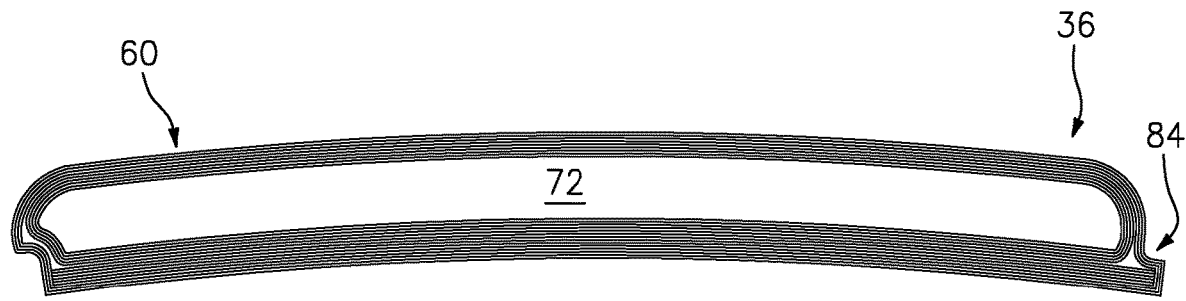
FIG. 10 is a schematic cross sectional ply pattern of the core of an exemplary CMC pocket BOAS.

The blade outer air seal 36 is formed as a ceramic matrix composite material. The ceramic composite material blade outer air seal 36 can be formed from continuous fiber construction. FIG. 10 shows an exemplary embodiment with the blade outer air seal core 60 formed via an overwrap of braids of fibers without lap joints. In an exemplary embodiment, the core 60 can be configured from a single cavity or from two cavities. The CMC blade outer air seal 36 can be produced around a core mandrel (not shown) with overwrap braids to simplify construction.

The blade outer air seal 36 includes a body 62 that has a leading edge 64 and a trailing edge 66 that is opposite the leading edge 64. The body 62 is generally a rectilinear configuration with a first side 68 and a second side 70 opposite the first side 68 in parallel relationship. The first side 68 and second side 70 are configured to be oriented axially parallel to the axis A of the engine 10. The leading edge 64 and trailing edge 66 are configured to be parallel and align parallel with the leading edge side 40 and trailing edge side 42 of the control ring 34. The body 62 is also configured with an arcuate shape to match the curvature of the control ring 34. The body 62 can include a constant wall thickness along the span of the blade outer air seal 36. The constant wall thickness reduces stresses from thermal gradients.

An axial cavity or simply pocket 72 is formed in the body 62 between an upper region 74 and a lower region 76. The pocket 72 extends between the first end side 68 and the second end side 70. The pocket 72 is configured to receive the hook 48 and engage the hook 48 to secure the blade outer air seal 36 to the control ring 34. The trailing edge 66 of the blade outer air seal body 62 is configured to align with the clip mounting flange 58 on the trailing edge side 42 of the control ring 34, as shown in FIG. 3. The pocket 72 allows for minimal radial features in the blade outer air seal 36, thus improving the thermal gradient characteristics.

A notch 78 is formed in the upper region 74 of the body 62. The notch 78 is configured to receive the clip 52. The notch 78 is configured to be aligned with the clip receiver 50 when the blade outer air seal 36 is coupled to the control ring 34. In an exemplary embodiment, the notch 78 is shaped to match the clip base 54 and receive the clip base 54. The clip 52 biasing element 56 is configured to detachably engage the clip mounting flange 58 and the upper region 74 of the blade outer air seal 36. The clip 52 along with the notch 78 and the hook 48 are configured as an anti-rotation feature 80 to inhibit rotation of the blade outer air seal 36 when mounted to the control ring 34.

A shelf 82 is formed in the body 62 extending from the lower region 76. The shelf 82 extends axially outward away from the pocket 72 on the leading edge 64 side of the body 62. The shelf 82 mates to the interior side of the control ring 34. The shelf 82 provides a leading edge sealing land on the blade outer air seal that extends axially from the pocket 72.

The body 52 further includes a chamfer 84 formed at each of the first end 68 and the second end 70 opposite thereof. The chamfer 84 is configured to facilitate a ship lap 86 engagement along each of the first end 68 and second end 70 from the leading edge 64 to the trailing edge 66. The chamfer 84 also allows for an intersegment feather seal 88 to be utilized between the adjoining blade outer air seals 36. The intersegment feather seal 88 can have an "L" shaped cross-section configured insertable in the gap of the ship lap joint 86.

The benefit of the above described arrangement is to allow for individual installation and removal of each blade outer air seal 36 from the blade outer air seal control ring 34. The individual blade outer air seal 36 can be replaced without the need to disassemble the entire BOAS assembly. The individual blade outer air seal 36 can be mounted to the control ring 34 by installing the upper region 74 of the BOAS body 62 such that, the hook 48 is inserted into the pocket 72. The trailing edge 66 of the blade outer air seal 36 is aligned flush with an extremity 90 of the clip mounting flange 58. The clip 52 is inserted into the control ring 34 from the leading edge side 40 into the clip receiver 50 and engaged with the clip mounting flange 58 of the control ring 34, as well as, the notch 78, the biasing element 56 presses against the clip mounting flange 58 and the upper region 74 and trailing edge 66 of the body 74. The pocket 72 and hook 4 engagement promote a large contact surface 92 that distribute stresses to reduce delamination and reduce bearing loads.

The clip 52 gives the advantage to provide a simple way to secure, anti-rotate, and preload axially mounted BOAS with one part.

Another advantage of the clip 52 is that it only has three features, simplifying the manufacturing process.

Another advantage of the clip 52 is that the anti-rotation feature of the clip fits into a notch on the BOAS and the spring end hook that clips over the side of the BOAS, preventing movement.

Another advantage is that the clip 52 is easily installed through a slot on the front of a BOAS control ring by pushing it until it clips onto the BOAS. Once installed, the spring pushes on the BOAS, providing the needed preloading force.

There has been provided a clip for a ceramic matrix composite blade outer air seal. While the ceramic matrix composite blade outer air seal has been described in the context of specific embodiments thereof, other unforeseen alternatives, modifications, and variations may become apparent to those skilled in the art having read the foregoing description. Accordingly, it is intended to embrace those alternatives, modifications, and variations, which fall within the broad scope of the appended claims.

What is claimed is:

1. A clip for an air seal assembly, comprising:
   a blade outer air seal control ring comprising:
     a leading edge side and a trailing edge side opposite said leading edge side;
     a hook protruding axially from said leading edge side;
     a clip base having a control ring interface;
     a blade outer air seal coupled to said blade outer air seal control ring, said blade outer air seal comprising:
       a body having a leading edge and a trailing edge opposite thereof,
       a pocket formed into said body having an upper region and a lower region, said pocket configured to receive and engage with said hook;
       a notch being formed into said upper region,
       a shelf formed from said lower region extending axially outward from said pocket on said leading edge side of said body;
     said clip base insertable into a clip receiver and configured to engage said notch of the blade outer air seal and configured to detachably couple with a clip mounting flange;
     a biasing element coupled to said clip base opposite said control ring interface; wherein said clip base is insertable into the clip receiver configured as a through bore in the blade outer air seal control ring extending from the leading edge side to the trailing edge side and configured to engage the notch of the blade outer air seal and configured to detachably couple with the clip mounting flange formed in the trailing edge of the blade outer air seal control ring, the clip mounting flange extending from said trailing edge side proximate said clip receiver.

2. The clip of claim 1, wherein said blade outer air seal comprises a ceramic matrix composite material.

3. The clip of claim 1, wherein said clip is configured to be biased to retain the blade outer air seal engaged with the blade outer air seal control ring.

4. The clip of claim 1, wherein said biasing element is configured to detachably engage said clip mounting flange and the upper region of said blade outer air seal.

5. The clip of claim 1, wherein said clip is configured to prevent axial rotation of the blade outer air seal.

6. The clip of claim 1, wherein said blade outer air seal can be configured as a plurality of blade outer air seals, each of said plurality of blade outer air seals are configured to be individually installed and removed from said blade outer air seal control ring.

7. The clip of claim 1, wherein said clip with said notch and said hook are configured as an anti-rotation feature to inhibit rotation of said blade outer air seal.

8. The clip of claim 1, wherein said clip base is formed to fit within the clip receiver.

9. The clip of claim 1, wherein said biasing element is configured as a curved sheet with at least one of a U bend, S bend, and hook shaped profile.

10. The clip of claim 1, wherein the biasing element is welded onto the clip base opposite the control ring interface.

11. The clip of claim 1, wherein the clip is configured to employ a radial preloading force to trap the blade outer air seal in a mounted position.

12. The clip of claim 1, wherein the clip base comprises a T cross section configured to secure the clip in the clip receiver.

13. A clip for a blade outer air seal assembly, comprising:
a blade outer air seal control ring comprising:
a leading edge side and a trailing edge side opposite said leading edge side;
a hook protruding axially from said leading edge side;
a clip base having a control ring interface;
a blade outer air seal coupled to said blade outer air seal control ring, said blade outer air seal comprising:
a body having a leading edge and a trailing edge opposite thereof,
a pocket formed into said body having an upper region and a lower region, said pocket configured to receive and engage with said hook;
a notch being formed into said upper region,
a shelf formed from said lower region extending axially outward from said pocket on said leading edge side of said body;
said clip base insertable into a clip receiver and configured to engage said notch of the blade outer air seal and configured to detachably couple with a clip mounting flange;
a biasing element coupled to said clip base opposite said control ring interface; wherein said clip base is insertable into the clip receiver configured as a through bore in the blade outer air seal control ring extending from the leading edge side to the trailing edge side and configured to engage the notch of the blade outer air seal and configured to detachably couple with the clip mounting flange formed in the trailing edge of the blade outer air seal control ring, the clip mounting flange extending from said trailing edge side proximate said clip receiver; wherein said blade outer air seal can be configured as a plurality of blade outer air seals each of said plurality of blade outer air seals are configured to be individually installed and removed from said blade outer air seal control ring.

14. A spring clip for a blade outer air seal assembly, comprising:
a blade outer air seal control ring comprising:
a leading edge side and a trailing edge side opposite said leading edge side;
a hook protruding axially from said leading edge side;
a clip base having a control ring interface;
the blade outer air seal coupled to said blade outer air seal control ring, said blade outer air seal comprising:
a body having a leading edge and a trailing edge opposite thereof,
a pocket formed into said body having an upper region and a lower region, said pocket configured to receive and engage with said hook;
a notch being formed into said upper region,
a shelf formed from said lower region extending axially outward from said pocket on said leading edge side of said body;
said clip base insertable into a clip receiver and configured to engage said notch of the blade outer air seal and configured to detachably couple with a clip mounting flange;
a biasing element coupled to said clip base opposite said control ring interface; wherein said clip base is insertable into the clip receiver configured as a through bore in the blade outer air seal control ring extending from the leading edge side to the trailing edge side and configured to engage the notch of the blade outer air seal and configured to detachably couple with the clip mounting flange formed in the trailing edge of the blade outer air seal control ring, the clip mounting flange extending from said trailing edge side proximate said clip receiver, wherein the spring clip is configured to employ a radial preloading force to trap the blade outer air seal in a mounted position.

* * * * *